US006468440B1

(12) United States Patent
Sakurada et al.

(10) Patent No.: US 6,468,440 B1
(45) Date of Patent: Oct. 22, 2002

(54) MAGNET POWDER AND METHOD FOR PRODUCING THE SAME, AND BONDED MAGNET USING THE SAME

(75) Inventors: Shinya Sakurada, Tokyo; Tomohisa Arai, Kanagawa-ken; Masami Okamura, Kanagawa-ken; Keisuke Hashimoto, Kanagawa-ken; Takahiro Hirai, Kanagawa-ken, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/646,793

(22) PCT Filed: Mar. 26, 1999

(86) PCT No.: PCT/JP99/01549

§ 371 (c)(1),
(2), (4) Date: Sep. 22, 2000

(87) PCT Pub. No.: WO99/50857

PCT Pub. Date: Oct. 7, 1999

(30) Foreign Application Priority Data

Mar. 27, 1998 (JP) ........................................ 10-081724
Jul. 29, 1998 (JP) ........................................ 10-213644

(51) Int. Cl.[7] ........................................ C04B 35/04

(52) U.S. Cl. .................... 252/62.54; 148/101; 148/122; 148/301

(58) Field of Search ................................ 148/101, 102, 148/104, 121, 122, 301, 302; 252/62.54, 62.55

(56) References Cited

U.S. PATENT DOCUMENTS 5,456,769 A * 10/1995 Sakurada et al. ........... 148/301
5,480,495 A 1/1996 Sakurada et al. ........... 148/301
5,482,573 A 1/1996 Sakurada et al. ........... 148/301
5,549,766 A 8/1996 Tsutai et al. ................ 148/301
5,658,396 A 8/1997 Sakurada et al. ........... 148/301
5,716,462 A 2/1998 Sakurada et al. ........... 148/302
5,750,044 A 5/1998 Yoneyama et al. ...... 252/62.54

FOREIGN PATENT DOCUMENTS

| | | |
|---|---|---|
| JP | 2-57663 | 2/1990 |
| JP | 3-16102 | 1/1991 |
| JP | 5-82041 | 11/1993 |
| JP | 6-172936 | 6/1994 |
| JP | 7-66021 | 3/1995 |
| JP | 8-316018 | 11/1996 |
| JP | 9-74006 | 3/1997 |

* cited by examiner

*Primary Examiner*—John Sheehan
(74) *Attorney, Agent, or Firm*—Foley & Lardner

(57) ABSTRACT

Magnet powder has a composition expressed by $(R^1_X R^2_Y B_Z T_{100-X-Y-Z})_{100-Q} N_Q$ (in formula, $R^1$ is at least one kind of element selected from rare earth elements, $R^2$ is at least one kind of element selected from Zr, Hf and Sc, T is at least one kind of element selected from Fe and Co, and X, Y, Z and Q are numbers satisfying 2 atomic %≦X, 0.01 atomic %≦Y, 4≦X+Y≧20 atomic %, 0≦Z≦10 atomic %, and 0.1≦Q≦20 atomic %, respectively), and $TbCu_7$ crystal phase as a principal phase. In such magnet powder, a ratio of fine particles of which maximum diameter is 22 μm or less is 20% by weight or less. Alternatively, surface roughness of particles constituting the magnet powder is 5 μm or less in terms of maximum height $R_y$ provided in JIS B 0601-1994. Accordingly, to such a magnet powder, excellent magnetic properties can be obtained with reproducibility.

27 Claims, 2 Drawing Sheets

MAGNET POWDER AND METHOD FOR PRODUCING THE SAME, AND BONDED MAGNET USING THE SAME

TECHNICAL FIELD

The present invention relates to magnet powder that is used as high performance permanent magnet and to a manufacturing method thereof, and to bond magnet therewith.

BACKGROUND ART

So far, as one kind of high performance permanent magnet, rare earth based magnets such as Sm—Co based magnet, Nd—Fe—B based magnet and so on are known. These magnets include much Fe or Co to contribute in an increase of saturation magnetic flux density. The rare earth elements such as Nd and Sm, due to behavior of 4f electrons in a crystal field, give rise to very large magnetic anisotropy. Thereby, coercive force is increased.

Such high performance magnets are mainly used in electrical appliances such as speakers, motors, measuring instruments and so on. In recent years, demand for downsizing various kinds of electrical appliances has increased. In order to cope with this, permanent magnet of higher performance is in demand. To such demands, compounds having $TbCu_7$ crystal structure excellent in magnet properties and compounds containing nitrogen therein are proposed (cf. Japanese Patent Laid-open Application Nos. HEI 6-172936 official gazette and HEI 9-74006 official gazette, U.S. Pat. Nos. 5,480,495, 5,482,573, 5,549,766, 5,658,396, 5,716,462 or the like).

Magnet material having $TbCu_7$ crystal structure as a principal phase is usually manufactured through a step of preparing master alloy, a step of heat treatment, and further a step of nitriding treatment. The step of preparing master alloy is implemented by use of liquid quenching method or mechanical alloying method. The step of heat treatment is implemented with the primary intention of controlling metallurgical structure of the master alloy. The step of nitriding treatment is applied with a primary intention of introducing nitrogen into interstitial positions of the principal phase to heighten crystal magnetic anisotropy of the principal phase.

In the step of nitriding treatment, it is usual to introduce nitrogen in the magnet material in the following way. That is, in an atmosphere containing nitrogen gas or nitrogen compound gas such as ammonia, the material is heat-treated to introduce nitrogen. At this point, so far, in order to increase an absorption efficiency of nitrogen, master alloy material such as quenched ribbon is milled so that an average particle diameter becomes approximately several tens Am to several hundreds μm. After thereby increasing a specific surface area, heat treatment is implemented as a step of nitriding treatment.

In the step of nitriding treatment of the magnet material such as mentioned above, powder of smaller particle diameter absorbs nitrogen in excess during heat treatment to result in deterioration of magnetic properties. The existing nitrogen containing magnet material contains relatively much fine powder of which magnetic properties are deteriorated due to excess absorption of nitrogen. When much containing such fine powder, magnetic properties of magnet material as a whole deteriorates. From these reasons, in the magnet material thereto the nitriding treatment is implemented, it is demanded, by reducing an amount of fine powder that absorbs excess nitrogen, to suppress deterioration of magnetic properties.

Further, of the aforementioned manufacturing steps of the magnet material, in the step of quenching, ribbon-like alloy is prepared by use of for instance melt-spun method. In such allow ribbon (quenched ribbon), a fine crystalline phase (for instance, $TbCu_7$ crystal phase) of an average crystal grain diameter of several nm to several tens nm is generated. Such fine crystal phase is an indispensable condition for obtaining high residual magnetization of the magnet material, resultantly for obtaining high maximum magnet energy product.

However, in the process of quenching due to the existing melt-spun method or the like, particle diameter of the principal phase consisting of $TbCU_7$ crystal phase or the like is liable to scatter. As a result, deterioration of residual magnetization or the maximum magnetic energy product of the magnet material is liable to be caused. Thus, in view of an improvement of properties of the magnet material having $TbCU_7$ crystal phase as a principal phase, it is important to control the particle diameter of the quenched ribbon that becomes forming material of the magnet material, the magnet material resultant therefrom. Accordingly, magnet material of which particle diameter is made fine with reproducibility and uniformity is demanded.

An object of the present invention is to provide magnet powder that enables, by reducing an amount of fine powder of which magnetic powder properties deteriorate during the nitriding treatment, to obtain excellent magnet properties with reproducibility and a manufacturing method thereof. another object of the present invention is to provide magnet powder that enables, by making crystal grain diameters of quenched ribbon uniformly fine, to obtain excellent magnetic properties with reproducibility and a manufacturing method thereof. Still another object of the present invention is provided bond magnet of high performance by using such magnet powder.

DISCLOSURE OF THE INVENTION

In order to overcome the aforementioned problems, present inventors carried out intensive studies. As the result, the following is found. That is, quenched alloy (for instance, quenched ribbon) prepared due to liquid quenching method, when used as a master alloy and provided to the step of nitriding treatment without milling into an average particle diameter of approximately several tens μm to several hundreds μm like in the existing method, magnet powder of high magnetic properties can be obtained.

That is, when a surface area of quenched alloy such as quenched alloy ribbon is put S, quenched alloy of which average value of surface area S is 0.5 $mm^2$ or more or in which particles having a surface area S of 0.1 $mm^2$ or more are 50% or more is used. To the aforementioned quenched alloy, heat treatment is applied to introduce nitrogen. Thereby, an amount of fine particles deteriorated in magnetic properties due to excess absorption of nitrogen or an influence of oxidation can be reduced. According to the magnet powder reduced in an amount of the fine particles like this, the magnetic properties of magnet powder as a whole can be heightened.

At this time, the quenched alloy such as quenched ribbon cracks due to an inclusion of nitrogen. Accordingly, even if an average value of the surface area S of the initial quenched alloy is as large as 0.5 $mm^2$ or more, or even if particles of which surface area S is 0.1 $mm^2$ or more are 50% or more, absorption efficiency of nitrogen does not deteriorate. Accordingly, the magnet powder therein a desired amount of nitrogen is introduced can be obtained.

A first invention is accomplished based on such findings. A first magnet powder of the present invention is characterized in having a composition expressed by the following formula;

general formula:

$$(R^1{}_X R^2{}_Y B_Z T_{100-X-Y-Z})_{100-Q} N_Q$$

(in the formula, $R^1$ is at least one kind of element selected from rare earth elements, $R^2$ is at least one kind of element selected from Zr, Hf and Sc, T is at least one kind of element selected from Fe and Co, and X, Y, Z and Q are numbers satisfying respectively 2 atomic %≦X, 0.01 atomic %≦Y, 4≦X+Y≦20 atomic %, 0≦Z≦10 atomic %, and 0.1≦Q≦20 atomic %), and $TbCU_7$ crystal phase as a principal phase, a ratio of fine particles of which maximum diameter is 22 μm or less being 20% by weight or less.

Alternatively, the magnet powder having a composition expressed by the aforementioned general formula and $TbCu_7$ crystal phase as a principal phase is characterized in that a ratio of nitrogen content in atomic % of fine particles of which maximum diameter is 22 μm or less to an average nitrogen content in atomic % of the magnet powder is 1.3 or less.

A manufacturing method of the first magnet powder of the present invention is characterized in comprising a step of manufacturing alloy having a composition expressed by;

general formula:

$$R^1{}_X R^2{}_Y B_Z T_{100-X-Y-Z}$$

(in the formula, $R^1$ is at least one kind of element selected from rare earth elements, $R^2$ is at least one kind of element selected from Zr, Hf and Sc, T is at least one kind of element selected from Fe and Co, and X, Y, and Z are numbers satisfying respectively, 2 atomic %≦X, 0.01 atomic %≦Y, 4≦X+Y≦20 atomic %, and 0≦Z≦10 atomic %), and $TbCu_7$ crystal phase as a principal phase, by use of a quenching method, and a step of implementing heat treatment for introducing nitrogen to the quenched alloy of which average value of the surface area S is 0.5 $mm^2$ or less when the surface area of the quenched alloy is expressed by S.

Further, the inventors found that there is a close correlation between surface roughness of the quenched ribbon (alloy ribbon) that is prepared by use of liquid quenching method or the like and magnetic properties of magnet powder obtained therefrom. In the quenched ribbon and magnet powder resultant therefrom, by reducing the surface roughness thereof, magnetic properties of the magnet powder can be improved with reproducibility.

Smoothness of the surface of the quenched ribbon is closely related to wettability between molten melt and a roll during quenching. In general, bad wettability of the molten metal results in bad smoothness of the quenched ribbon, good wettability enables to produce the quenched ribbon of smooth surface. In the quenched ribbon of which wettability with the roll is excellent and surface roughness is small, difference of cooling speeds of a surface is contact with the roll and a free solidification surface is small. As a result, even if for instance a thickness of a ribbon is thick, whole material can be uniformly and sufficient quenched. Accordingly, the quenched ribbon as a whole, crystal grain diameter can be made fine with reproducibility and uniformity.

Further, the quenched ribbon of which surface is smoothed is preferably used in the later nitriding treatment in view of uniformly nitriding whole material. From these reasons, according to the magnet powder obtained from the quenched ribbon of small surface roughness, high magnetic properties can be obtained with reproducibility.

A second invention is achieved based on such findings. A second magnet powder of the present invention is characterized in having a composition expressed by;

general formula:

$$(R^1{}_X R^2{}_Y B_Z T_{100-X-Y-Z})_{100-Q} N_Q$$

(in formula, $R^1$ is at least one kind of element selected from rare earth elements, $R^2$ is at least one kind of element selected from Zr, Hf and Sc, T is at least on kind of element selected from Fe and Co, and X, Y, Z and Q are numbers satisfying respectively, 2 atomic %≦X, 0.01 atomic %≦Y, 4≦X+Y≦20 atomic %, 0≦Z≦10 atomic %, and 0.1≦Q≦20 atomic %), and having $TbCU_7$ crystal phase as a principal phase, surface roughness of particles constituting the magnet powder being 5 μm or less in terms of maximum height $R_Y$ provided in JIS B 0601.

A manufacturing method of the second magnet powder of the present invention is characterized in comprising a step of manufacturing, by use of the liquid quenching method, allowing have a composition expressed by;

general formula:

$$R^1{}_X R^2{}_Y B_Z T_{100-X-Y-Z}$$

(in the formula, $R^1$ is at least one kind of element selected from rare earth elements, $R^2$ is at least one kind of element selected from Zr, Hf and Sc, T is at least one kind of element selected from Fe and Co, and X, Y and Z are numbers satisfying respectively, 2 atomic %≦X, 0.01 atomic %≦Y, 4≦X+Y≦20 atomic %, and 0≦Z≦10 atomic %), and having $TbCu_7$ crystal phase as a principal phase, so that the surface roughness thereof becomes 5 μm or less in terms of maximum height $R_y$ provided in JIS B 601.

Bond magnet of the present invention comprises a mixture of the aforementioned magnet powder of the present invention and binder, the mixture having a molded body of magnet shape.

BEST MODES FOR IMPLEMENTING THE INVENTION

Figure 1:
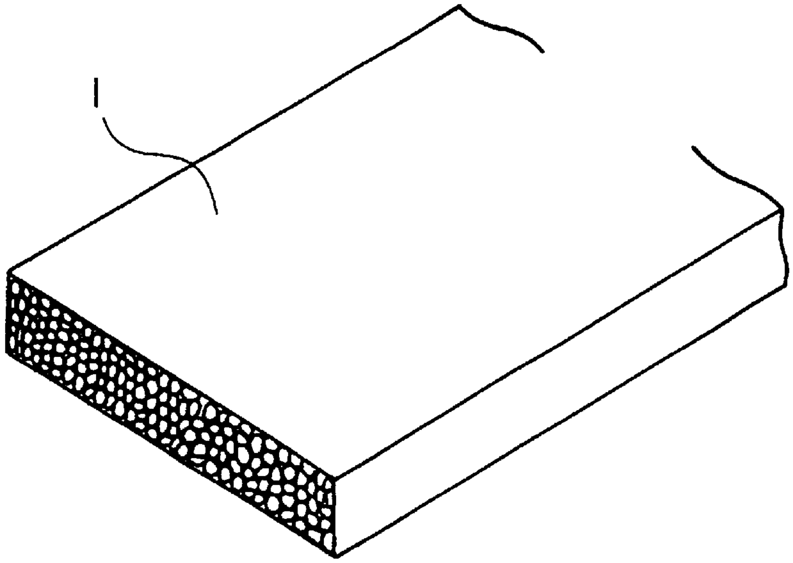
FIG. 1 is a diagram schematically showing a fine structure of quenched ribbon used in preparation of the second magnet powder of the present invention.

In the following, modes for implementing the present invention will be described.

A first magnet powder of the present invention is characterized in having a composition expressed by:

general formula:

$$(R^1{}_X R^2{}_Y B_Z T_{100-X-Y-Z})_{100-Q} N_Q \quad (1)$$

(in the formula, $R^1$ is at least one kind of element selected from rare earth elements, $R^2$ is at least one kind of element selected from Zr, Hf and Sc, T is at least one kind of element selected from Fe and Co, and X, Y, Z and Q are numbers satisfying respectively, 2 atomic %≦X, 0.01 atomic %≦Y, 4≦X+Y≦20 atomic %, ≦Z≦10 atomic %, and 0.1≦Q≦20 atomic %), and in having $ThCu_7$ crystal phase (a phase having $TbC_7$ crystal structure) as a principal phase. In such magnet powder, in the first invention, a ratio of fine particles of which maximum diameter is 22 μm or less is 20% by weight or less. Alternatively, a ratio of nitrogen content in atomic % of the aforementioned fine particles to an average nitrogen content in atomic % of the magnet powder is 1.3 or less.

First, reasons for compounding the respective components constituting magnet powder of the present invention and reasons for providing compounding amounts will be described.

A rare earth element as the $R^1$ element is a component that introduces a large magnetic anisotropy in magnet material and resultantly gives high coercive force thereto. As such $R^1$ element, rare earth elements such as La, Ce, Pr, Nd, Sm, Eu, Gd, Tb, Dy, Ho, Er, Tm, Lu and Y can be cited. Among these, in particular, 50 atomic % or more of the $R^1$ element is preferable to be Sm. Thereby, the principal phase can be heightened in magnetic anisotropy and increased in coercive force.

The content X of the $R^1$ element is 2 atomic % or more of metal component. The metal component here includes all components except nitrogen and the X element that will be described later, conveniently including boron. When the content of the $R^1$ element in the metal component is less than 2 atomic %, magnetic anisotropy remarkably deteriorates to result in a difficulty in obtaining magnet powder of large coercive force. On the other hand, when the $R^1$ element is contained in excess, saturation magnetic flux density of the magnet powder decreases. The content X of the $R^1$ element in the metal component is preferable to be in the range of 4≦X≦16 atomic %.

The $R^2$ element is at least one kind of element selected from Zr, Hf and Sc. Such $R^2$ element occupies rare earth sites in the principal phase to exhibit an effect of reducing an average atomic radius of the rare earth site. Thereby, a concentration of Fe or Co in the principal phase consisting of $TbCu_7$ crystal phase can be increased. Further, the $R^2$ element makes particles fine to favorably affect on fine texture of the magnet material and to contribute in improving coercive force and residual magnetization.

The content Y of the $R^2$ element in the metal component is set at 0.01 atomic % or more in view of obtaining the aforementioned effect. More preferable content Y of the $R^2$ element in the metal component is in the range of 0.1≦Y≦10 atomic %. Further, Y is desirable to be in the range of 1≦Y≦3 atomic %.

A total amount (X+Y) of the $R^1$ and $R^2$ elements is set at 4 atomic % or more of the metal component in view of rendering the magnet powder high coercive force. When the total amount (X+Y) of the $R^1$ and $R^2$ elements in the metal component is less than 4 atomic %, α-Fe(Co) remarkably precipitates to result in deteriorating magnetic properties such as coercive force or the like. On the other hand, when exceeding 20 atomic %, the saturation magnetization largely deteriorates. Accordingly, the total amount (X+Y) of the $R^1$ and $R^2$ elements in the metal component is set in the range of 4≦X+Y≦20 atomic %. The total amount of X and Y is more preferable to be in the range of 4≦X+Y≦16 atomic %.

The T element is at least one kind of element selected from Fe and Co and has a function of increasing saturation magnetization of the magnet powder. The increase of the saturation magnetization induces an increase of residual magnetization and, accompanying this, the maximum magnetic energy product also increases. Such T element is preferable to be contained 70 atomic % or more in the magnet powder, thereby enabling to effectively increase the saturation magnetization of the magnet powder. Further, in view of further increasing the saturation magnetization of the magnet powder, 50 atomic % or more of the T element is preferable to be Fe.

Part of the T element can be replaced by at least one kind of element (hereinafter, referred to as M element) selected from Ti, V, Cr, Mo, W, Mn, Ga, Al, Sn, Ta, Nb, Si and Ni. By replacing the part of the T element with such M element, practically important properties such as corrosion resistance and heat resistance can be improved. However, too much replacement of the T element with the M element remarkably deteriorates the magnetic properties. Accordingly, an amount of replacement of the T element by the M element is preferable to be 20 atomic % or less.

B (boron) is an element effective in improving residual magnetization of the magnet material but is not necessarily required to compound in the magnet powder of the present invention. When B is contained in excess, in the process of heat treatment, $R_2Fe_{14}B$ phase is conspicuously generated to be liable to result in deteriorating the magnetic properties of the magnet powder. Accordingly, when compounding B, the content Z is set at 10 atomic % or less of the metal component. The content Z of B in the metal component is more preferable to be in the range of 0.001≦Z≦4 atomic %, being further preferable to be in the range of 0.001≦Z≦2 atomic %.

N (nitrogen) exists mainly in the interstitial sites of the principal phase and has a function of, in comparison with the case when N is not contained, improving Curie temperature and magnetic anisotropy of the principal phase. Of these, the improvement of magnetic anisotropy is of importance in giving large coercive force to the magnet powder. Though N, by compounding only a small amount, exhibits its effect, when contained too much, amorphous phase or α-Fe phase tends to generate to result in deterioration the magentic properties of the magnet powder. Accordingly, the content Q of nitrogen in the magnet powder is set in the range of 01.0≦Q≦20 atomic %, more preferable content Q of nitrogent being the range of 5≦Q≦20 atomic %, still more preferable content being in the range of 10≦Q≦20 atomic %.

Part of nitrogen (N) may be replaced by at least one kind of element (X element) selected from hydrogen (H), carbon (C), and phosphorus (P). Thereby, the magnetic properties such as coercive force can be improved. However, when too much N is replaced by the X element, an improvement effect of Curie temperature or magnetic anisotropy of the principal phase is deteriorated. Accordingly, an amount of replacement of N by the X element is set at 50 atomic % or less of N.

The magnet powder expressed by the aforementioned formula (1) is allowed to contain inevitable impurities such as oxides or the like.

Nitrogen is introduced by heat treating the quenched ribbon containing prescribed amounts of the respective elements. At this time, the nitrogen is introduced by applying heat treatment to the quenched ribbon of which average value of surface area S is 0.5 $mm^2$ or more, or the quenched ribbon in which particles having the surface area S of 0.1 $mm^2$ or more are 50% or more. Thus, without milling the quenched ribbon to fine particles, nitrogen introduction treatment (nitriding treatment) is applied to coarse quenched ribbon. Thereby, an amount of fine particles of which magnetic properties are deteriorated due to excess absorption of nitrogen can be reduced. In specific, flake-like magnet powder excellent in magnetic properties in which a ratio of fine particles having a maximum diameter of 22 μm or less is 20% by weight or less can be obtained.

The quenched ribbon cracks due to the absorption of nitrogen. Such rupture of the ribbon due to the absorption of nitrogen gradually proceeds with the time of nitriding treatment. Accordingly, even if the initial quenched ribbon is relatively coarse such as the average value of the surface area S is 0.5 $mm^2$ or more, or particles of which surface area S is 0.1 $mm^2$ or more are 50% or more, in other words, even if a specific surface area of the initial quenched ribbon is small, absorption efficiency of nitrogen does not deteriorate. That is, a desired amount of nitrogen can be introduced.

When the surface area of the quenched ribbon thereto nitriding treatment is applied is large, the particle diameter of the magnet powder obtained after the nitriding treatment can be maintained large. That is, in the magnet particles constituting the magnet powder, a ratio of fine particles having a maximum diameter of 22 μm or less of which magnetic properties are deteriorated due to the excess absorption of nitrogen, or due to an influence of oxidation can be decreased to 20% by weight or less.

According to the magnet powder of which amount of fine powder is reduced, the magnet powder as a whole can be improved in magnetic properties. Though the magnetic properties of the magnet powder can be improved by increasing an amount of Co in the T element, since Co is expensive compared with Fe, an increase of manufacturing cost of the magnet powder is caused. According to the magnet powder of the present invention, without increasing an amount of Co, the magnetic properties can be inexpensively improved. Further, the magnet powder of which amount of fine particles is reduced, being excellent in handling, contributes in reducing the manufacturing cost of the bond magnet therewith.

When the ratio of fine particles having a maximum diameter of 22 μm or less exceeds 20% by weight, such fine particles affect much on the magnetic properties of the whole magnet powder, resulting in deteriorating the magnetic properties of the whole magnet powder. Further, when a ratio of fine particles in which nitrogen is much contained exceeds 20% by weight or more, a distribution of an amount of nitrogen in the magnet powder becomes non-uniform, thereby the magnetic properties of the magnet powder being deteriorated. The ratio of the aforementioned fine particles in the magnet powder is more preferable to be 10% by weight or less. Here, the maximum diameter of the magnet particle denotes a diameter of a minimum circle including the same.

In the present invention, the ratio of the fine particles having a maximum diameter of 22 μm or less, after image processing the magnet powder, can be calculated based on the result of the image processing. Alternatively, the ratio of the fine particles having a maximum diameter of 22 μm or less can be approximated by a ratio of particles passed through a sieve when sieving the magnet powder by use of a sieve of a mesh of 22 μm (#22 sieve)

In the magnet powder of the present invention, furthermore, a ratio of fine particles of which surface area S is $1\times10^{-3}$ $mm^2$ or less is preferable to be 20% by weight or less. Thereby, the magnetic properties of the magnet powder can be further improved. A ratio of fine particles of which surface area is $1\times10^{-3}$ $mm^2$ or less is more preferable to be 10% by weight or less. The magnet particles obtained by applying the nitriding treatment to the quenched ribbon have a shape of approximate plane table-like (flake-like). Accordingly, by observing the magnet particles with an optical microscope or a scanning electron microscope and measuring the thickness thereof and an area of the plane table surface, the surface area of the magnet particle can be calculated.

The magnet powder of the present invention has $TbCu_7$ crystal phase as a principal phase. Magnet material having the $TbCu_7$ crystal phase as a principal phase, compared with magnet material having $Th_2Zn_{17}$ crystal phase as a principal phase, is excellent in magnetic properties such as saturation magnetization or the like. Further, the $TbCu_7$ crystal phase is preferable to have a ratio of lattice constants c/a of 0.847 or more. In such case, larger saturation magnetization can be obtained, in addition, residual magnetization can be increased. The ratio of lattice constants c/a of the $TbCu_7$ crystal phase can be controlled through component composition of the magnet powder or manufacturing method thereof.

The principal phase in the magnet powder of the present invention is one of which volume ratio in constituent phases including amorphous phase in alloy is largest. In specific, the volume ratio is preferable to be 50% or more. The volume ratio of the $TbCU_7$ crystal phase is more preferable to be 80% or more. The constituent phases in the magnet powder can be easily confirmed by use of X-ray diffraction or the like. The volume occupation ratio of each phase generated in the magnet material can be obtained from a transmission electron micrograph of a section of the magnet material by use of areal analysis method. With a ratio of section areas due to areal analysis method, the volume ratio can be approximated. The volume occupation ratio in the present invention is a value obtained by averaging over 10 measured points.

In the present invention, the flake-like magnet powder therein nitrogen is introduced, in manufacturing the bond magnet or the like, may be further milled. In the magnet powder of the present invention, as mentioned above, the nitriding treatment is previously applied to relatively coarse quenched ribbon to reduce the ratio of fine particles of which magnetic properties are deteriorated. Accordingly, the magnet powder, even if milled thereafter, is not deteriorated of the magnetic properties as the whole magnet powder like the existing magnet powder.

According to the present invention, a nitrogen content in atomic % in the fine particles of which maximum diameter is 22 μm or less can be made 1.3 times or less an average nitrogen content in atomic % of the magnet powder. Thus, by suppressing an amount of nitrogen in the fine particles from being excess, the magnetic properties of the magnet powder as a whole can be improved. Here, a ratio of the nitrogen content in the fine particles to the average nitrogen content is a value expressed by y/x when the average nitrogen contents is x and the nitrogen content in the fine particles is y.

The milling of the magnet powder of the present invention is preferably implemented so that the maximum diameter becomes in the range of for instance 10 to 100 μm. When the maximum diameter of the magnet powder is made less than 10 μm, due to an influence of oxidation or the like, the magnetic properties tend to deteriorate. On the other hand, when the maximum diameter of the magnet powder exceeds 500 μm, an effect due to the milling can not be sufficiently obtained. That is, by controlling the particle diameter of the magnet powder in the aforementioned range, in manufacturing the bond magnet by use of the magnet powder of the present invention, due to an improvement of packing density, the magnetic properties can be improved and to productivity can be heightened.

The first magnet powder of the present invention is manufactured in the following way for instance.

First, an ingot containing prescribed amounts of the respective elements of $R^1$, $R^2$, T and B, further M element as needed, is prepared by use of arc melting method or high frequency induction method. The ingot is cut into small pieces, after melting by use of the high frequency induction method, the molten metal is ejected from a nozzle onto a metal roll rotating with high speed to manufacture quenched ribbon. Other than single roll method like this, the quenched ribbon may be prepared by applying twin-roll method, rotating disc method, gas atomization or the like.

The process of quenching is preferably implemented in an inert gas atmosphere of such as Ar, He or the like. By quenching in the atmosphere like this, deterioration of the magnetic properties due to oxidation can be prevented from occurring. To the quenched ribbon obtained by the step of quenching, as needed, in an inert gas atmosphere of such as Ar, He or in a vacuum, heat treatment may be applied at a temperature of approximately 300 to 1000° C. for 0.1 to 10 hours. By applying such heat treatment, the amorphous phase generated in the step of quenching is crystallized, or the magnetic properties such as coercive force can be improved. The heat treatment is more preferably implemented under the conditions of temperature of approximately 700 to 800° C. and time period of 0.2 to 1 hour.

By the aforementioned step of quenching and heat treatment, alloy ribbon having a composition expressed by; general formula:

$$R^1_X R^2_Y B_Z T_{100-X-Y-Z} \quad (2)$$

(in the formula, $R^1$ is at least one kind of element selected from rare earth elements, $R^2$ is at least one kind of element selected from Zr, Hf and Sc, T is at least one kind of element selected from Fe and Co, and X, Y, and Z are numbers satisfying respectively, 2 atomic %≦X, 0.01 atomic %≦Y, 4≦X+Y≦20 atomic %, and 0≦Z≦10 atomic %), and having $TbCu_7$ crystal phase as a principal phase is prepared.

Next, the quenched ribbon undergoes nitriding treatment to introduce nitrogen, thereby flake-like magnet powder of the present invention can be obtained. The nitriding treatment is preferably implemented in an atmosphere of nitrogen gas of 0.001 to 100 atmosphere under a temperature of 400 to 500° C. The nitriding treatment is preferably implemented in the range of 0.1 to 300 hours.

The atmosphere during nitriding treatment, instead of nitrogen gas, can be that of nitrogen compound such as ammonia gas or the like. When ammonia gas is used, nitriding reaction rate can be increased. At this time, by simultaneously employing gases such as hydrogen, nitrogen and argon, the rate of nitriding reaction can be controlled. Further, as a pretreatment step of the nitriding treatment, by applying heat treatment in a hydrogen gas atmosphere of 0.001 to 100 atmosphere under a temperature of 100 to 700° C., or by employing a mixture gas of nitrogen gas and hydrogen gas, an efficiency of the nitriding treatment can be increased.

The aforementioned nitriding treatment is applied to quenched ribbon to which an existing step of milling is not implemented to make an average particle diameter of the powder several tens μm to several hundreds μm and of which average value of surface area S is 0.5 $mm^2$ or more, or in which particles of surface area S of 0.1 $mm^2$ or more is 50% or less.

When the average value of surface area S of the quenched ribbon thereto the nitriding treatment is applied is less than 0.5 $mm^2$, or when particles of surface area S of 0.1 $mm^2$ or more are less than 50%, during the heat treatment, excess nitrogen is absorbed to result in an increase of fine particles of which magnetic properties are deteriorated. Thereby, magnet powder as a whole, the magnetic properties deteriorate. The average value of surface area S of the quenched ribbon thereto the nitriding treatment is applied is further preferable to be 1.0 $mm^2$ or more.

At this time, the quenched ribbon cracks due to inclusion of nitrogen. Rupture of the ribbon due to the inclusion of nitrogen gradually proceeds with the time of nitriding treatment. Accordingly, even if the initial average value of surface area S of the quenched ribbon is such large as 0.5 $mm^2$ or more, an absorption efficiency of nitrogen is not deteriorated. That is, a desired amount of nitrogen as mentioned above can be introduced. Thereby, the magnet powder as a whole, the magnetic properties can be improved.

In the present invention, as a step of pretreatment of the nitriding treatment, a step of milling can be applied to the quenched ribbon to the extent that relatively fine particles of the maximum diameter of 50 μm or less are not generated much. Such a step of pretreatment is implemented to the extent that the average value of surface area S of the quenched ribbon maintains 0.5 $mm^2$ or more. Alternatively, to the extent that the ratio of particles of which surface area S is 0.1 $mm^2$ or more becomes 50% or more, the milling step is carried out. The step of milling is preferably implemented to the extent that the ratio of particles of the maximum diameter of 50 μm or less is controlled to be 10% by weight or less.

The flake-like magnet powder undergone the step of nitriding treatment can be milled as demands arise. At this time, as mentioned above, the maximum diameter of the magnet particles is preferable to be in the range of 10 to 500 μm. Despite the implementation of such step of milling, since the magnet powder of the present invention has undergone the nitrogen introducing treatment at the stage of quenched ribbon, different from the existing magnet powder, the magnetic properties do not deteriorate.

Next, an embodiment of a second magnet powder of the present invention will be described.

The second magnet powder of the present invention possesses the aforementioned composition of formula (2) and TbCu7 crystal phase as a principal phase. In the magnet powder like this, in the second invention, the surface roughness of particles constituting the magnet powder is set at 5 μm or less in terms of maximum height $R_y$ provided in JIS B 0601. The surface roughness of the magnet particles is preferable to be 2 μm or less in terms of the maximum height Ry further preferable to be 1 μm or less in terms of the maximum height Ry. The volume occupation ratio and ratio of lattice constants of $TbCu_7$ crystal phase as a principal phase are preferable to be identical with the first magnet powder.

The surface roughness of the magnet powder can be measured by use of particles of which maximum diameter is for instance 150 μm or more. As mentioned above, the shape of the magnet powder obtained by implementing the nitriding treatment to the quenched ribbon is approximately plane table-like (flake-like) . Accordingly, by use of particles of which maximum diameter is for instance 150 μm or more, the maximum height $R_y$ can be measured.

The magnet powder such as described above can be obtained by introducing nitrogen into the alloy ribbon (quenched ribbon) of which maximum height $R_y$ is 5 μm or less. The quenched ribbon having the composition expressed by the aforementioned formula (2) can be prepared by applying the liquid quenching method such as single roll method or twin roll method. At this time, by improving wettability between the molten metal and the roll during quenching, surface smoothness of the quenched ribbon can be improved.

In general, when the wettability of the molten metal is bad, the smoothness of the quenched ribbon is bad, and in the opposite case, the quenched ribbon of smooth surface can be manufactured. The quenched ribbon (alloy ribbon) of which wettability with the roll is good and surface roughness is small, in specific, the quenched ribbon of which maximum height $R_y$ is 5 μm or less, is small in difference between the cooling rate of a surface in contact with the roll (roll surface) and that of a free solidification surface. Accordingly, even if the thickness of the ribbon is large, the material as a whole can be uniformly and sufficiently quenched.

Figure 2:
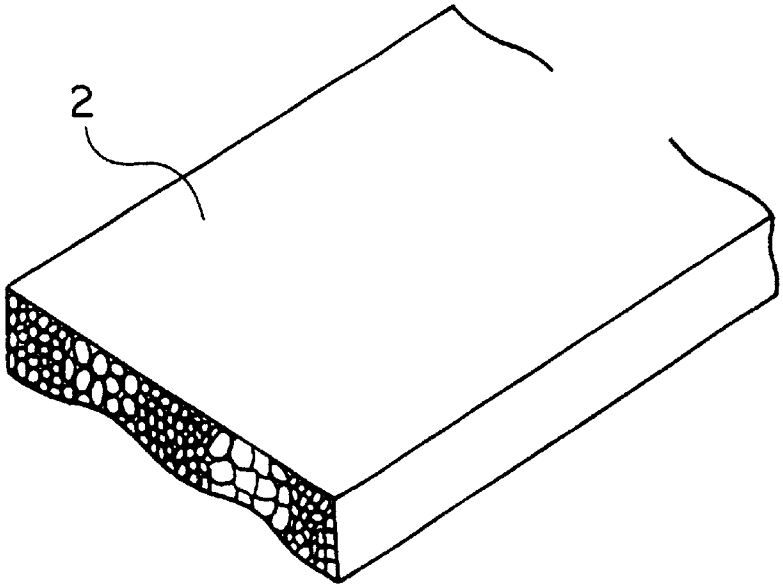
FIG. 2 is a diagram schematically showing a fine structure of quenched ribbon that is large in surface roughness shown as a comparative example with the present invention.

As schematically shown in FIG. 1, in a quenched ribbon 1 of smooth surface, the quenched ribbon as a whole, crystal grain diameter can be made fine with reproducibility and uniformity. On the other hand, as shown in FIG. 2, an allow ribbon 2 of large surface roughness is partly insufficiently quenched. At those portions, crystal grain diameter becomes coarser.

The quenched ribbon 1 of which surface roughness is made 5 μm or less in terms of maximum height $R_y$, as the whole ribbon, has fine and uniform crystal grain diameter. By applying nitriding treatment to such quenched ribbon 1, flat magnet particles of which surface roughness is 5 μm or less in terms of maximum height $R_y$ can be obtained. Such magnet particles have fine $TbCu_7$ crystal phase of an average crystal grain diameter of several nm to several tens nm. The quenched ribbon 1 of which surface is smoothed is convenient also in view of uniformly nitriding the whole material in the subsequent step of nitriding treatment. Thereby, the magnetic properties such as residual magnetization and the maximum magnetic energy product of the magnet powder can be increased.

Further, in the quenched ribbon for magent material used in the second invention, even if the thickness thereof is large, the whole material is uniformly and sufficiently quenched. For instance, even if the quenched ribbon is such thick as 17 μm or more, the crystal grain diameter can be made fine with reproducibility and uniformity. According to the magnet powder obtained by applying the nitriding treatment to the quenched ribbon such as described above, in manufacturing bond magnet therewith, packing density of the magnet powder in the bond magnet can be increased. Accordingly, the bond magnet of excellent magnetic properties can be obtained.

In order to reduce the surface roughness of the quenched ribbon for magnet material, it is effective to appropriately control manufacturing conditions in the step of quenching. As the manufacturing conditions in the step of quenching, for instance, ejection pressure, roll material, roll peripheral speed, surface state of roll, shape and size of nozzle aperture, gap between roll and nozzle, atmosphere pressure during ejection, temperature of molten metal or the like can be cited.

As described above, the surface roughness is closely related particularly with the wettability of the molten metal and the roll. Accordingly, it is effective to elevate the temperature of the molten metal for instance during ejection as much as possible to lower the viscosity of the molten metal. When Sm is used as the rare earth element $R^1$, however, if the temperature of the molten metal is elevated too much, an amount of vaporization becomes large to result in a difficulty in controlling the composition. In view of lowering the viscosity of the molten metal, by adjusting amounts of Zr or B in the alloy composition, and a compounding amount of T element as needed, melting point of the material can be effectively lowered.

The quenched ribbon for magnet material used in the second invention and magnet material therewith can be manufactured in the following ways for instance.

First, similarly with the first invention, molten alloy of the composition expressed by the aforementioned formula (2) is ejected from a nozzle onto a metal roll revolving with high speed to prepare a quenched ribbon. At this time, by controlling alloy composition, temperature of molten metal, an aperture diameter of nozzle, roll peripheral speed, roll material, ejection pressure or the like, the wettability of the molten metal and the roll can be heightened. Other conditions than these are preferably set identically with that of the first invention. For the heat treatment or the like, the same is preferable.

Next, the aforementioned quenched ribbon, as demands arise, is milled by use of ball mill, brown mill, stamp mill, jet mill or the like. The nitriding treatment is applied to such alloy powder to introduce nitrogen. The conditions for nitriding treatment are as mentioned above. The nitriding treatment can be implemented after the quenched ribbon is milled, or as similarly with the first invention, can be applied to the quenched ribbon or one that is broken. By applying the nitriding treatment to the relatively coarse quenched ribbon, as mentioned in the first invention, the ratio of fine particles of which magnetic properties are deteriorated due to the excess absorption of nitrogen can be decreased.

The magnet material of the present invention is suitable for constituent material of for instance bond magnet. In the following, a method of manufacturing the bond magnet from the magnet powder of the present invention will be explained. When manufacturing the bond magnet, usually the magnet material is milled to use. However, in the aforementioned step of manufacturing the magnet material, the milling, when applied in advance, can be omitted.

(a) The magnet powder of the present invention is mixed with organic binder, followed by compression molding or injection molding into a desired shape to manufacture bond magnet. For the binder, for instance, epoxy-based or nylon-based resin can be used. When thermosetting resin such as epoxy-based resin is used as the binder, after molding into the desired shape, the bond magnet is preferably cured at a temperature of approximately 100 to 200° C.

(b) The magnet powder of the present invention, after mixing with low-melting metal or low-melting alloy, is compression molded to manufacture metal bond magnet. In this case, the low-melting metal or low-melting alloy plays a role of the binder. As the low-melting metal, for instance, Al, Pb, Sn, Zn, Cu, and Mg can be cited. For the low-melting alloy, alloys containing the aforementioned low-melting metals can be used.

Next, concrete embodiments of the first magnet powder of the present invention and results of evaluation will be explained.

Embodiments 1 to 11

First, the respective raw materials of high purity are compounded with the respectively prescribed ratios, followed by high frequency induction melting in an atmosphere of Ar to prepare raw material ingots. Next, these raw material ingots are melted in an atmosphere of Ar due to high frequency induction heating. Thereafter, molten metals are ejected from a nozzle having an aperture of 0.6 mm onto a metal roll revolving with a peripheral speed of 40 m/s. Thereby, the respective quenched ribbons are prepared.

Subsequently, the aforementioned quenched ribbons each are heat treated in an atmosphere of Ar at a temperature of 770° C. for 35 minute. By carrying out X-ray diffraction analysis of the quenched ribbons each after heat treatment, it is found that in all the quenched ribbons, all diffraction peaks except slight ones of α-Fe phase can be indexed to $TbCu_7$ crystal phase and the ratios of lattice constants c/a are in the range of 0.856 to 0.868.

Subsequently, the aforementioned quenched ribbons each are observed with an optical microscope and a SEM. By measuring a thickness of the quenched ribbon and an area of the solidification surface thereof, a surface area of the quenched ribbon is calculated. The surface area is calculated for 20 to 30 points of the quenched ribbon of each embodiment to obtain an average value. These values are shown in Table 1, respectively. There are 50% or more of particles of which surface area is 0.1 $mm^2$ or more.

Next, in order to introduce nitrogen into the aforementioned quenched ribbons, the quenched ribbons each are heat treated in a flow of gas mixture of ammonia gas and hydrogen gas under the condition of 430° C.×3 hour. Thereafter, heat treatment is applied at the same temperature in a flow of Ar gas for 3 hours to obtain flake-like magnet powder, respectively.

Compositions of the obtained magnet powders are shown in Table 1. The compositions shown in Table 1 are results of analysis due to ICP emission spectrometry, combustion infrared absorption, and high frequency heat conductivity detection. Due to the aforementioned nitriding treatment, weight of each material is increased by 3.2 to 3.9%. The ratio of flow rates of ammonia gas and hydrogen gas is 1:15.

Thereafter, the flake-like magnet powders are milled so that the average diameter becomes approximately 15 μm. Of these milled powders each, a ratio (y/x) of a nitrogen content in atomic % y in the fine particles of the maximum diameter of 22 μm or less to an average nitrogen content in atomic % x of the magnet powder is measured. Results shown in Table 1.

To the milled magnet powders each, 2.5% by weight of epoxy resin is added, after mixing, followed by compression molding under a pressure of 1200 MPa, further followed by curing treatment at a temperature of 150° C. for 2.5 hours. Thus, bond magnets each are manufactured. Of the obtained bond magnets each, coercive force, residual magnetic flux density, and maximum magnetic energy product are measured, respectively. These results are together shown in Table 1.

Comparative Examples 1 to 2

Quenched ribbons each manufactured due to a method similar with that of the aforementioned embodiment 1, after heat treatment in an atmosphere similarly with the embodiment 1, are milled so that average particle diameters each become approximately 250 μm. To these alloy powders each, after applying the nitriding treatment under the identical conditions with that of embodiment 1, similarly with embodiment 1, bond magnets each are manufactured. Of these bond magnets each, coercive force, residual magnetic flux density and maximum magnetic energy product are together

TABLE 1

| | Alloy Composition (atomic %) | Average Surface Area S ($mm^2$) | Ratio of Fine Particles (wt %): Particles of Maximum Diameter of 22 μm or less | Ratio of Fine Particles (wt %): Particles of Minute Surface Area | Ratio of Nitrogen Content in in Fine Particles to Average Value | Coercive Force (KA/m) | Residual Magnetic Flux Density (T) | Maximum Energy Product ($kJ/m^3$) |
|---|---|---|---|---|---|---|---|---|
| | Embodiment | | | | | | | |
| 1 | $Sm_{6.4}Y_{0.3}Zr_{2.0}B_{1.3}Co_{6.1}Mn_{0.1}N_{14.5}Fe_{bal}$ | 2.28 | 2 | 8 | 1.08 | 783 | 0.72 | 84 |
| 2 | $Sm_{6.0}Er_{0.1}Zr_{2.4}B_{0.8}Co_{2.8}Cr_{0.2}N_{15.0}Fe_{bal}$ | 4.75 | 5 | 11 | 1.21 | 748 | 0.74 | 88 |
| 3 | $Sm_{6.5}Zr_{2.1}B_{1.1}Co_{3.9}Ti_{0.5}N_{15.1}Fe_{bal}$ | 5.15 | 3 | 7 | 1.06 | 775 | 0.75 | 86 |
| 4 | $Sm_{6.2}Nd_{0.2}Zr_{2.2}B_{1.7}Co_{5.1}Ni_{0.3}N_{14.7}Fe_{bal}$ | 1.32 | 1 | 5 | 1.03 | 722 | 0.76 | 90 |
| 5 | $Sm_{6.4}Pr_{0.3}Zr_{2.3}Hf_{0.1}B_{0.5}Co_{4.2}V_{0.2}N_{14.0}Fe_{bal}$ | 10.55 | 3 | 8 | 1.10 | 695 | 0.76 | 88 |
| 6 | $Sm_{6.8}Er_{0.1}Zr_{2.0}B_{1.2}Co_{4.5}Ta_{0.1}N_{14.2}Fe_{bal}$ | 11.32 | 4 | 10 | 1.15 | 761 | 0.73 | 86 |
| 7 | $Sm_{6.5}Zr_{2.2}B_{1.0}Co_{3.8}Nb_{0.6}Si_{0.1}N_{15.0}Fe_{bal}$ | 5.50 | 12 | 13 | 1.22 | 785 | 0.72 | 88 |
| 8 | $Sm_{6.2}Nd_{0.4}Zr_{2.3}B_{1.5}Co_{3.9}W_{0.2}C_{1.5}N_{13.8}Fe_{bal}$ | 3.28 | 2 | 7 | 1.07 | 738 | 0.75 | 90 |
| 9 | $Sm_{6.6}Ce_{0.3}Zr_{2.2}B_{1.3}Co_{5.8}Al_{0.2}N_{14.8}Fe_{bal}$ | 6.73 | 2 | 5 | 1.03 | 698 | 0.75 | 88 |
| 10 | $Sm_{6.5}Zr_{2.3}B_{0.8}Co_{6.1}Ti_{0.5}Sn_{0.1}N_{14.5}Fe_{bal}$ | 0.99 | 1 | 2 | 1.01 | 715 | 0.74 | 81 |
| 11 | $Sm_{6.5}Zr_{2.3}Co_{3.8}Ni_{0.2}Ti_{0.1}N_{14.7}Fe_{bal}$ | 6.50 | 6 | 22 | 1.22 | 698 | 0.75 | 89 |
| | Comparative Example | | | | | | | |
| 1 | $Sm_{6.5}Zr_{2.2}B_{1.1}Co_{4.0}Nb_{0.7}Ga_{0.1}N_{15.7}Fe_{bal}$ | 0.06 | 38 | 85 | 1.38 | 728 | 0.70 | 72 |
| 2 | $Sm_{6.6}Er_{0.2}Zr_{2.1}B_{1.3}Co_{3.8}Cr_{0.5}N_{15.9}Fe_{bal}$ | 0.04 | 55 | 88 | 1.41 | 653 | 0.68 | 70 |

The magnet powders each are sieved with a sieve of a mesh of 22 μm. The ratio of particles passed through the sieve is obtained as a ratio of fine particles of which maximum diameter is 22 μm or less. Further, based on the observations with an optical microscope and SEM, surface areas of the magnet powder are calculated. Thereby, the ratio of the fine particles having the surface area of $1\times10^{-3}$ $mm^2$ or less is obtained. These results are shown in Table 1, respectively.

shown in Table 1.

As obvious from Table 1, compared with the bond magnets according to comparative example where the nitriding treatment is applied to the milled master alloys, the following is found. That is , the bond magnets according to the respective embodiments where the nitriding treatment is applied in the stage of quenched ribbon are excellent in magnetic properties. This is because an amount of fine particles that absorb excess nitrogen at the time of the nitriding treatment and tend to deteriorate the magnetic properties is extremely little in the magnet powders according to the respective embodiments.

Next, specific embodiments of the second magnet powder of the present invention and results of evaluations thereof will be explained.

Embodiments 12 to 16

First, raw materials of high purity each are compounded with the respective prescribed ratios, followed by high frequency induction melting in an atmosphere of Ar to prepare raw material ingots, respectively. Subsequently, these raw material ingots are melted in an atmosphere of Ar by use of high frequency induction heating. Thereafter, molten metals are ejected from a nozzle having an aperture of 0.5 mm onto a copper roll of a diameter of 300 mm revolving with a peripheral speed of 3.5 m/s. Thereby, the respective quenched ribbons are prepared. The temperature of the molten metal during ejection is set at 1400° C. or more. Average surface roughness (Ry) of thus obtained respective quenched ribbons is measured. Results are shown in Table 2.

Subsequently, the aforementioned quenched ribbons each are heat treated in an atmosphere of Ar at a temperature of 780° C. for 30 minutes. By carrying out X-ray diffraction analysis of the quenched ribbons each after heat treatment, it is found that in all quenched ribbons, all diffraction peaks except slight ones of α-Fe phase are indexed to $TbCu_7$ crystal phase and the ratios of lattice constants c/a are in the range of 0.856 to 0.868.

Next, in order to introduce nitrogen into the aforementioned quenched ribbon each, the quenched ribbons each are heat treated in a gas mixture of ammonia and hydrogen under the condition of 430° C.×3 hour. Thus, flake-like magnet powders each are prepared. Compositions of the obtained magnet powders are shown in Table 2. The measurement of the maximum heights $R_y$ of the obtained flake-like magnet powders each with particles of which maximum diameter is 150 μm or more revealed that the surface roughness of the respective quenched ribbons are maintained. The compositions shown in Table 2 are results of analysis due to ICP emission spectrometry, combustion infrared absorption, and high frequency heat conductivity detection.

The flake-like magnet powders each are milled, to the milled magnet powders each, 2.5% by weight of epoxy resin is added, followed by mixing. Thereafter, the mixture is compression molded under a pressure of 1200 MPa, further followed by curing treatment at a temperature of 150° C. for 2.5 hours. Thereby, bond magnets each are manufactured. Coercive force, residual magnetic flux density, and maximum magnetic energy product of the obtained bond magnets each are shown in Table 2.

Comparative Example 3

A quenched ribbon is prepared according to the method similar with that of the aforementioned Embodiment 12. However, the temperature of the molten metal during ejection of the molten metal is set at a temperature of 1300 to 1400° C. Subsequently, to the quenched ribbon, in the similar ways with that of Embodiment 12, heat treatment in Ar and nitriding treatment are applied to manufacture magnet powder. Then, similarly with Embodiment 12, bond magnet is prepared. Average surface roughness ($R_y$) of the quenched ribbon and magnetic properties of bond magnet in the present comparative example 3 are together shown in Table 2.

TABLE 2

| | Alloy Composition (atomic %) | Surface Roughness of Quenched Ribbon Ry (μm) | Properties of Bond Magnet: Coercive Force (kA/m) | Residual Magnetic Flux Density (T) | Maximum Energy Product (kJ/m³) |
|---|---|---|---|---|---|
| Embodiment 12 | $Sm_{6.1}Zr_{3.3}Co_{4.5}Nb_{0.2}B_{1.1}N_{13.5}Fe_{bal}$ | 1.2 | 750 | 0.78 | 98 |
| Embodiment 13 | $Nd_{0.2}Sm_{6.2}Zr_{3.0}Co_{4.3}Ti_{0.3}B_{0.9}N_{14.5}Fe_{bal}$ | 2.5 | 723 | 0.76 | 88 |
| Embodiment 14 | $Pr_{0.4}Sm_{6.3}Zr_{2.6}Co_{3.7}Al_{0.5}B_{1.3}N_{13.9}Fe_{bal}$ | 1.0 | 775 | 0.77 | 99 |
| Embodiment 15 | $Ce_{0.3}Sm_{6.0}Zr_{2.7}Co_{3.8}Ga_{0.2}B_{0.7}N_{15.1}Fe_{bal}$ | 3.1 | 705 | 0.78 | 90 |
| Embodiment 16 | $Sm_{6.3}Zr_{2.9}Hf_{0.1}Co_{5.1}C_{0.6}N_{13.5}Fe_{bal}$ | 1.3 | 738 | 0.77 | 95 |
| Comparative Example 3 | $Sm_{6.0}Zr_{3.3}Co_{4.4}Nb_{0.2}B_{1.1}N_{13.8}Fe_{bal}$ | 6.5 | 712 | 0.73 | 73 |

As obvious from Table 2, the magnet powders of the respective embodiments in which quenched ribbons (alloy ribbons) of small surface roughness are used and the bond magnets used the same, compared with the magnet powder of Comparative Example 3 in which the quenched ribbon of larger surface roughness is used and the bond magnet used the same, are found to be excellent in the magnetic properties.

Embodiment 17

When preparing alloy ribbon of the composition identical with that of Embodiment 14, ejection pressure, peripheral speed of roll, aperture of nozzle, gap between roll and nozzle and temperature of molten metal during ejection are varied. Thereby, plural quenched ribbons of different surface roughness are prepared. To these quenched ribbons each, in the similar ways with that of Embodiment 12, the heat treatment in Ar and nitriding treatment are applied to manufacture magnet powders. And, in the similar methods with that of Embodiment 12, bond magnets are manufactured.

Figure 3:
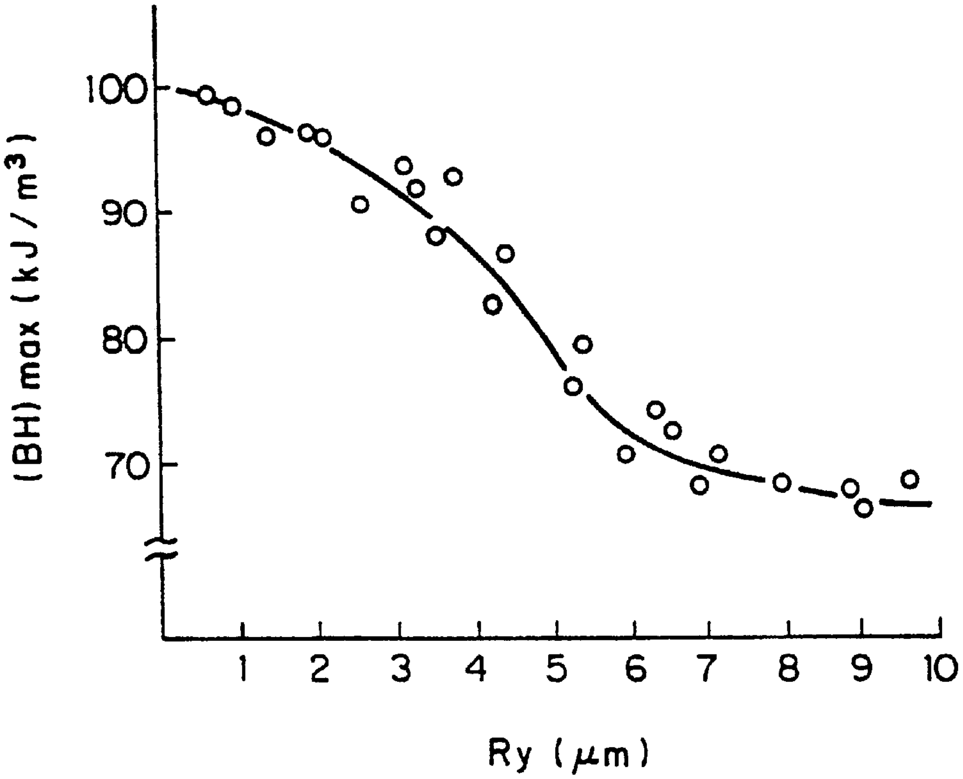
FIG. 3 is a diagram showing the relationship between surface roughness of quenched ribbon for magnet material and magnet particles and the maximum magnetic energy product of bond magnet therewith.

With the plural bond magnets thus obtained, the maximum magnetic energy products are measured. The results are shown in FIG. 3 as the relationship between the surface roughness (surface roughness of magnet particles) and the maximum magnetic energy products of the bond magnets. As obvious from FIG. 3, with a decrease of the surface roughness of the quenched ribbon (magnet powder), the properties of the bond magnet are improved. By employing the quenched ribbon (magnet powder) of the maximum height $R_y$ of 5 μm or less, excellent magnetic properties can be obtained.

INDUSTRIAL APPLICABILITY

A first magnet powder of the present invention is reduced in an amount of fine particles that cause deterioration of magnetic properties due to excess absorption of nitrogen. Accordingly, material as a whole can provide magnet powder of excellent magnetic properties. The use of such magnet powder enables to provide bond magnet of excellent magnetic properties with reproducibility.

Further, in a second magnet powder of the present invention, by reducing surface roughness of each magnet particle, particle diameter of material as a whole can be made fine with uniformity and reproducibility. Accordingly, magnet powder of excellent magnetic properties can be provided. By employing such magnet powder, bond magnet of excellent magnetic properties can be provided with stability.

What is claimed is:

1. A magnet powder comprising a composition expressed by:

general formula:

$$(R^1_x R^2_y B_z T_{100-X-Y-Z})_{100-Q} N_Q$$

wherein $R^1$ is at least one kind of element selected from rare earth elements, $R^2$ is at least one kind of element selected from Zr, Hf and Sc, T is at least one kind of element selected from Fe and Co, and X, Y, Z and Q are numbers satisfying 2 atomic %≦X, 0.01 atomic %≦Y, 4≦X+Y≦20 atomic %, 0≦Z≦10 atomic %, and 0.1≦Q≦20 atomic %, respectively, and having a $TbCu_7$ crystal phase as a principal phase;

wherein an amount of a fine particle having a maximum diameter of 22 μm or less in the magnet powder is 20% by weight or less.

2. The magnet powder as set forth in claim 1:

wherein the amount of a fine particle having a maximum diameter of 22 μm or less in the magnet powder is 10% by weight or less.

3. The magnet powder as set forth in claim 1:

wherein the amount of a fine particle having a surface area of $1\times10^{-3}$ $mm^2$ or less in the magnetic powder is 20% by weight or less.

4. The magnet powder as set forth in claim 3:

wherein the amount of a fine particle having a surface area of $1\times10^{-3}$ $mm^2$ or less in the magnetic powder is 10% by weight or less.

5. The magnet powder as set forth in claim 1:

wherein a ratio of a nitrogen content in atomic % of the fine particle having a maximum diameter of 22 μm or less to an average nitrogen content in atomic % of the magnet powder is 1.3 or less.

6. The magnet powder as set forth in claim 1:

wherein a value of Z expressing an amount of the B is in the range of 0.001 to 4 atomic %.

7. The magnet powder as set forth in claim 1, further comprising at least one kind of M element selected from Ti, V, Cr, Mo, W, Mn, Ga, Al, Sn, Ta, Nb, Si and Ni;

wherein the T element is replaced by the M element by 20 atomic % or less.

8. The magnet powder as set forth in claim 1, further comprising at least one kind of X element selected from H, C and P;

wherein the N element is replaced by the X element by 50 atomic % or less.

9. A magnet powder comprising a composition expressed by;

general formula:

$$(R^1_x R^2_Y B_Z T_{100-X-Y-Z})_{100-Q} N_Q$$

wherein $R^1$ is at least one kind of element selected from rare earth elements, $R^2$ is at least one kind of element selected from Zr, Hf and Sc, T is at least one kind of element selected from Fe and Co, and X, Y, Z and Q are numbers satisfying 2 atomic %≦X, 0.01 atomic %≦Y, 4≦X+Y≦20 atomic %, 0≦Z≦10 atomic %, and 0.1≦Q≦20 atomic %, respectively, and having a $TbCu_7$ crystal phase as a principal phase;

wherein a ratio of a nitrogen content in atomic % of a fine particle having a maximum diameter of 22 μm or less in the magnetic powder to an average nitrogen content in atomic % of the magnet powder is 1.3 or less.

10. The magnet powder as set forth in claim 9:

wherein a value of Z expressing an amount of the B is in the range of 0.001 to 4 atomic %.

11. The magnet powder as set forth in claim 9, further comprising at least one kind of M element selected from Ti, V, Cr, Mo, W, Mn, Ga, Al, Sn, Ta, Nb, Si and Ni;

wherein the T element is replaced by the M element by 20 atomic % or less.

12. The magnet powder as set forth in claim 9, further comprising at least one kind of X element selected from H, C and P;

wherein the N element is replaced by the X element by 50 atomic % or less.

13. A magnet powder comprising a composition expressed by:

general formula:

$$(R^1_x R^2_y B_z T_{100-x-y-z})_{100-Q} N_Q$$

wherein $R^1$ is at least one kind of element selected from rare earth elements, $R^2$ is at least one kind of element selected from Zr, Hf and Sc, T is at least one kind of element selected from Fe and Co, and X, Y, Z and Q are numbers satisfying 2 atomic %≦X, 0.01 atomic %≦Y, 4≦X+Y≦20 atomic %, 0≦Z≦10 atomic %, and 0.1≦Q≦20 atomic %, respectively, and having a $TbCu_7$ crystal phase as a principal phase;

wherein a surface roughness of particles of the magnet powder is 5 μm or less in terms of the maximum height Ry defined in JIS B 0601.

14. The magnet powder as set forth in claim 13:

wherein the surface roughness of particles is 2 μm or less in terms of the maximum height Ry.

15. The magnet powder as set forth in claim 13:

wherein a value of Z expressing an amount of the B is in the range of 0.001 to 4 atomic %.

16. The magnet powder as set forth in claim 13, further comprising at least one kind of M element selected from Ti, V, Cr, Mo, W, Mn, Ga, Al, Sn, Ta, Nb, Si and Ni;

wherein the T element is replaced by the M element by 20 atomic % or less.

17. The magnet powder as set forth in claim 13, further comprising at least one kind of X element selected from H, C and P;

wherein the N element is replaced by the X element by 50 atomic % or less.

18. A method of manufacturing a magnet powder, comprising:

forming a quenched alloy ribbon having an alloy composition expressed by the general formula:

$$R^1_x R^2_y B_z T_{100-x-y-z}$$

wherein $R^1$ is at least one kind of element selected from rare earth elements, $R^2$ is at least one kind of element selected from Zr, Hf and Sc, T is at least one kind of element selected from Fe and Co, and X, Y and Z are numbers satisfying 2 atomic %≦X, 0.01 atomic %≦Y, 4≦X+Y≦20 atomic %, and 0≦Z≦10 atomic %, by melting the alloy composition and quenching the molten alloy composition, the quenched alloy ribbon having a $TbCu_7$ crystal phase as a principal phase and having an average surface area S of 0.5 $mm^2$/particle or more: and nitriding the quenched alloy ribbon by heating in an atmosphere containing nitrogen to form a magnet powder having a flake shape.

19. The method of manufacturing a magnet powder as set forth in claim 18, further comprising milling the quenched alloy ribbon prior to nitriding, to the extent that the average value of the surface area S maintains 0.5 $mm^2$/particle or more.

20. The method of manufacturing a magnet powder as set forth in claim 18, further comprising:

milling the quenched alloy ribbon prior to nitriding to the extent that an amount of particles having a surface area S of 0.1 $mm^2$/particle or more is 50% or more.

21. The method of manufacturing a magnet powder as set forth in claim 19:

wherein the milling step is implemented to the extent that an amount of particles having a maximum particle diameter of 50 μm or less is 10% by weight or less.

22. The method of manufacturing a magnet powder as set forth in claim 18:

wherein in the nitriding step, nitrogen in the range of 0.1 to 20 atomic % is introduced in the quenched alloy ribbon.

23. A method of manufacturing a magnet powder, comprising:

forming a quenched alloy ribbon having a composition expressed by:

general formula:

$$R^1_x R^2_y B_z T_{100-x-y-z}$$

wherein $R^1$ is at least one kind of element selected from rare earth elements, $R^2$ is at least one kind of element selected from Zr, Hf and Sc, T is at least one kind of element selected from Fe and Co, and X, Y and Z are numbers satisfying 2 atomic %≦X, 0.01 atomic %≦Y, 4≦X+Y≦20 atomic %, and 0≦Z≦10 atomic %, respectively, the quenched alloy ribbon having $TbCu_7$ crystal phase as a principal phase and having a surface roughness of 5 μm or less in terms of maximum height Ry defined by JIS B 0601; and nitriding the quenched alloy ribbon to form the magnet powder.

24. A bond magnet, comprising:

a mixture of the magnet powder set forth in claim 1 and a binder; wherein the mixture is a molded body having a magnet shape.

25. A bond magnet, comprising:

a mixture of the magnet powder set forth in claim 9 and a binder; wherein the mixture is a molded body having a magnet shape.

26. A bond magnet, comprising:

a mixture of the magnet powder set forth in claim 13 and a binder; wherein the mixture is a molded body having a magnet shape.

27. The method of manufacturing a magnet powder as set forth in claim 18, wherein the melting of the alloy composition in the step of forming of a quenched alloy ribbon having an alloy composition is performed at a temperature of 1400° C. or more.

* * * * *

UNITED STATES PATENT AND TRADEMARK OFFICE

CERTIFICATE OF CORRECTION

PATENT NO. : 6,468,440 B1 
DATED : October 22, 2002
INVENTOR(S) : Shinya Sakurada et al.

It is certified that error appears in the above-identified patent and that said Letters Patent is hereby corrected as shown below:

Title page,
Item [57], ABSTRACT,
Line 4, change "(in formula" to -- in the formula --.

Column 1,
Line 52, change "Am" to -- μm --.
Line 61, change "When much containing" to -- Because the magnet material contains --.
Line 62, change "deteriorates. From these reasons" to -- deteriorate. For these reasons --.

Column 2,
Line 3, change "of for" to -- of, for --.
Line 29, change "another" to -- Another --.
Line 40, change "the result" to -- a result --.
Line 49, change "is put S" to -- is put as surface area S --.
Line 66, change "magnet powder therein" to -- magnet powder can be obtained when --.
Line 67, delete "can be obtained"

Column 3,
Line 62, change "Accordingly, the" to -- Accordingly, taking the --.
Line 67, change "From" to -- For --.

Column 4,
Line 10, change "in formula" to -- in the formula --.

Column 6,
Line 3, change "preferable to be contained" to -- preferably contains --.

Column 8,
Line 28, change "areal" to -- a real --.
Line 34, change "therein" to -- wherein --.
Line 52, change "contents" to -- content --.

Column 9,
Line 14, change "atmosphere of such" to -- atmosphere such --.
Line 28, change "by;" to -- by --.
Line 40, change "thereby" to -- whereby --.

UNITED STATES PATENT AND TRADEMARK OFFICE

CERTIFICATE OF CORRECTION

PATENT NO. : 6,468,440 B1 
DATED : October 22, 2002
INVENTOR(S) : Shinya Sakurada et al.

It is certified that error appears in the above-identified patent and that said Letters Patent is hereby corrected as shown below:

Column 10,
Line 59, change "(flake-like) ." to -- (flake-like). --.

Column 11,
Line 30, change "several nm to several tens nm" to -- several nanometers to several tens nanometers --.
Line 37, change "magnet" to -- magnetic --.
Line 40, change "is such thick" to -- is of such thickness --.

Column 13,
Line 3, change "minute" to -- minutes --.
Line 10, change "a SEM" to -- an SEM --.

Column 14,
Line 3, change "these milled" to -- each of milled --.
Line 3, change "powders each" to -- powders --.
Line 6, change "Results shown" to -- These results are together shown --.
Line 9, change "To the" to -- To each of the --.
Line 9, change "powders each" to -- powders --.
Line 13, change "Thus, bond magnets each are manufactured. Of the obtained" to -- Thus, each bond magnet is manufactured. Of each of the obtained --.
Line 14, change "magnets each" to -- magnets --.
Line 22, change "ribbons each" to -- ribbons are each --.
Lines 27 and 30, delete "each,"
Line 29, delete "each"
Line 63, change "is ," to -- is, --.

Column 15,
Line 63, change "to the" to -- to each of the --.

Column 17,
Line 20, change "by" to -- by the general formula: --.
Line 21, delete "general formula:"

Column 18,
Line 2, change "by" to -- by the general formula: --.
Lines 5 and 35, delete "general forumla:"
Line 34, change "expressed by" to -- expressed by the general formula: --.

UNITED STATES PATENT AND TRADEMARK OFFICE

CERTIFICATE OF CORRECTION

PATENT NO. : 6,468,440 B1
DATED : October 22, 2002
INVENTOR(S) : Shinya Sakurada et al.

It is certified that error appears in the above-identified patent and that said Letters Patent is hereby corrected as shown below:

Column 19,
Line 16, change "more:" to -- more; --.

Column 20,
Line 4, change "expressed by" to -- expressed by the general formula: --.
Line 5, delete "general formula:"

Signed and Sealed this

Thirteenth Day of April, 2004

JON W. DUDAS
*Acting Director of the United States Patent and Trademark Office*